United States Patent [19]

Walters

[11] Patent Number: 5,115,394
[45] Date of Patent: May 19, 1992

[54] DUAL ENERGY COMPUTERIZED TOMOGRAPHY SYSTEM

[75] Inventor: Ronald G. Walters, Aurora, Ohio

[73] Assignee: Technicare Corporation, Solon, Ohio

[21] Appl. No.: 555,105

[22] Filed: Nov. 25, 1983

[51] Int. Cl.⁵ .............................................. G06F 15/42
[52] U.S. Cl. ........................... 364/413.17; 364/413.21; 378/4
[58] Field of Search .............. 364/414, 413.17, 413.21; 378/4, 5, 6, 7, 901; 358/111

[56] References Cited

U.S. PATENT DOCUMENTS

| | | | |
|---|---|---|---|
| 3,859,460 | 1/1975 | Westell | 358/222 X |
| 4,029,963 | 6/1977 | Alvarez et al. | 378/5 X |
| 4,149,081 | 4/1979 | Seppi | 378/5 X |
| 4,247,774 | 1/1981 | Brooks | 378/5 X |
| 4,255,664 | 3/1981 | Ruh et al. | 378/5 X |
| 4,463,375 | 7/1984 | Macovski | 378/99 X |
| 4,464,775 | 8/1984 | Yamagishi | 378/5 |

OTHER PUBLICATIONS

Split Xenon Detector for Tomochemistry in Computed Tomography: Aaron Fenster Jour of Comp Assi Tomo. vol. 2 243-258 Jul. 1979.

Primary Examiner—Jerry Smith
Assistant Examiner—Charles Meyer
Attorney, Agent, or Firm—Audley A. Ciamporcero, Jr.

[57] ABSTRACT

A dual energy method for CT scanning. Scanning is carried out at low and high energy levels, $S_2$ and $S_1$ respectively, each at a preselected dose level. Detected electronic signals ($I_2, I_1$) are digitized. A look up table is used to generate a pair of values from each pair of signals, one a photoelectric component and the other a Compton component. Each of these values are subjected to spatial filtering by a convolution filter function for each signal specially designed to increase the signal to noise ratio in the resultant combined image by exploiting the correlation in noise in the two values.

9 Claims, 3 Drawing Sheets

DUAL ENERGY COMPUTERIZED TOMOGRAPHY SYSTEM

FIELD OF THE INVENTION

This invention relates to computed tomography (CT) systems and, in particular, to the use of dual energy scanning for the production of CT images. It is also applicable to "projection only" systems such as those used in digital radiography.

BACKGROUND

In CT scanning it is desirable to be able to clearly distinguish between different materials. Indeed, the ability of CT systems "to discriminate between tissues with very slightly different X-ray absorption coefficients" contributes significantly to their success. R. A. Rutherford, et al., "Quantitative Aspects of Computer Assisted Tomography", p. 605, Proceedings of The British Institute of Radiology, July 1975. The ability to differentiate between different substances is a function of many factors. Important among these are the measurement techniques used and noise factors. Measurement techniques may distinguish among materials on the basis of factors such as density or chemical composition. Thus, materials which may be closely related in density may be distinguishable from each other on the basis of differing chemical composition. However, the differences between measurements may be so slight that they are easily masked by quantum noise in the system. In CT scanning this is frequently the case, where noise is great enough to make materials close in density difficult to differentiate.

The ability to distinguish between different materials in CT scanning is also a function of the energy level employed. CT scanners measure materials by detecting differences in energy attenuation, a function of density. Two materials may exhibit the same attenuation coefficients at 80 KeV (thousand electron volts), but may differ significantly in attenuation coefficients at 40 KeV. This is typically true of white and grey brain matter, a frequent subject of CT scanning and a common standard for the ability of a CT scanner to discriminate between materials close in density. A relatively low KeV scan is desirable for brain matter so that the two materials are readily distinguishable in the resultant image. But at these low energy levels, the flux level of conventional radiation sources used in CT scanning is generally insufficient to produce clearly distinguishable images in the presence of noise. Sufficient flux can usually only be obtained by using a higher KeV level with its broader energy spectrum and higher dose level. Thus a dilemma is present when a high flux level is desired with a low KeV scan.

Dual energy scanning systems have been suggested as the solution to many of these problems where two scans are made at a combined dose equal to the dose that would have been used if the single energy scan approach had been used. By taking two sets of measurements, one at a high KVP (kilovolts peak) at a specified dose level and another at a low KVP and at a specified corresponding dose level, information may be obtained from which estimates may be made about the distribution functions of attenuation coefficients at a given reconstruction energy. Given a low KVP energy spectrum and a high KVP energy spectrum, attenuation coefficient values may be obtained for each pixel in the displayed image. But the effects of noise differ for the two energy levels, and are most pronounced at the lower energy level. It is desirable, then, to be able to reduce the effects of noise on the reconstructed dual energy image, particularly at the lower of the two energy levels. See, for example, U.S. Pat. No. 4,029,963, issued Jun. 14, 1977, to Alvarez, et al. which suggests obtaining projection measurements of a CT X-ray transmission at low and high energies and reconstructing from such measurements two separate cross-sectional images one of which is suggested to be energy-independent. To date, however, there is not a single commercially available CT scanner designed for dual energy scanning.

SUMMARY OF THE INVENTION

In accordance with the principles of the present invention, a dual energy CT scanning system is provided which takes cognizance of the phenomenon that the two significant physical processes involved in photon attenuation, namely, photoelectric absorption and Compton scattering, exhibit correlated quantum noise components between the two energy levels. Furthermore, the photoelectric and Compton noise components are negatively correlated such that, for a system of known dual energy levels, the transfer function of a spatial filter may be specified for filtering either the photoelectric or Compton signal so that the photoelectric and Compton noise components will at least partially cancel each other when the signals are weighted and combined for monoenergetic image reconstruction. The filter characteristics are chosen from consideration of the Jacobian transfer function of the dual energy system used, which provides an indication of how noise is distributed in the system and what noise components are correlated. The noise cancellation provided by properly combining the filtered signals allows monoenergetic signal reconstruction at lower energy levels than would otherwise be possible by reason of the high degree of noise masking of tissue differentiation. Low energy reconstruction is desirable, since greater soft tissue discrimination is afforded at lower energy levels. In addition, the inventive system is tolerant of relatively lower dose levels in the higher of the two energy scans, permitting more of the total dose to be allocated to the more highly attenuated low energy scan.

The basic goal of dual energy methods is to produce monoenergetic reconstruction which are free from polychromatic artifacts. The choice of technique factors (KVP & Dose) and the chosen "reconstruction energy" greatly affect the results. For a given set of technique factors, image noise changes with the selected reconstruction energy and usually reaches a minimum somewhere between the two scan energies. That minimum is generally not as low as a conventional scan at the same dose. More important, however, is the reconstruction energy at which that minimum occurs.

Typical technique factors usually lead to a minimum in the 70-80 KeV range. Unfortunately, this is greater than the effective energy of a typical single energy scan, resulting in a significant reduction of soft tissue contrast. If one lowers the reconstruction energy, in order to retrieve lost contrast, the noise rises very rapidly. The net result is a decreased signal to noise ratio ("S/N"). In essence, the S/N ratio is improved by proper choice of the dual energy dose ratios and preferential spatial filtering. This allows significantly lower energy mono-chromatic reconstructions with negligible effect on spatial resolution and a much improved S/N ratio.

DETAILED DESCRIPTION OF THE PREFERRED EMBODIMENTS

Figure 1:
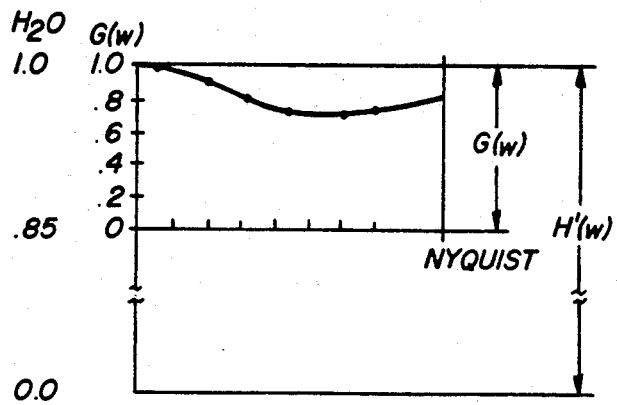
FIG. 1 is a graphical representation of a Modulation Transfer Function (M.T.F.)

In what follows, a specific example of this new dual energy method will be described.

MODEL AND BASIS FUNCTIONS

In the diagnostically relevant energy range there are only two significant physical processes involved in the attenuation of photons; they are photoelectric absorption ("P") and Compton scattering ("C"). In this range each process is essentially material independent, except for magnitude, and represents an energy dependent basis function. That is, for most materials, the mass attenuation function may be represented by a weighted linear combination of these basis functions. Thus the attenuation can be described as:

$$I_{(P,C)} = -\ln \int_0^\infty S_{(\epsilon)} e^{-P\mu p(\epsilon) - C\mu c(\epsilon)} d\epsilon \quad (1)$$

where:
 $\epsilon$ = photon energy in KeV
 $S_{(\epsilon)}$ = normalized effective spectrum
 $\mu p(\epsilon)$ = photoelectric basis function
 P = line integral of photoelectric component
 $\mu c(\epsilon)$ = Compton basis function
 C = line integral of Compton component It is convenient to normalize $\mu_p$ and $\mu_c$ to water, such that one cm of water would correspond to unity for P and C. Because the "two basis" concept is accurate but not exact, there are slight variations on the functions chosen for $\mu_p$ and $\mu_c$. In normalized form:

$$\mu_{p(\epsilon)} = 5400/\epsilon^{3.05} \quad (2)$$

and, $$\mu_{c(\epsilon)} = 0.168 \cdot K.N._{(\epsilon)} \quad (3)$$

where K. N. represents the Klein-Nishina function, which is a very accurate model of incoherent Compton scattering cross section. The K. N. function is described by, $$K.N._{(\epsilon)} = \frac{1+\alpha}{\alpha^2} \left[ \frac{2(1+\alpha)}{1+2\alpha} - \frac{1}{\alpha} \ln(1+2\alpha) \right] + \quad (4)$$

$$\frac{1}{2\alpha} \ln(1+2\alpha) = \frac{(1+3\alpha)}{(1+2\alpha)}$$

where:
 $\alpha = \epsilon/510.975$

The coefficients of eqs. (2) and (3) and the exponent of equation (2) are chosen as a reasonable compromise (for biological materials) for the slightly material dependent behavior of the photoelectric effect and compensation for coherent Compton scatter, which is nor included in the Klein-Nishina function.

On the premise of the linear two basis concept, the attenuation functions of any two sufficiently dissimilar materials may be used in place of $\mu_p$ and $\mu_c$ (with a corresponding linear transformation of coefficients P and C). This may prove very useful in the development of calibration procedures. However, for simplicity, we shall retain the photoelectric and Compton basis functions here.

DUAL ENERGY CONCEPT

This section describes the dual energy function and demonstrates preferred method for its inversion. We first determine the photoelectric and Compton components from the attenuations $I_1$ and $I_2$ and then determine the equivalent mono-energetic attenuation The function:

$$I_{(D)} = -\ln \int_0^\infty S_{(\epsilon)} e^{-\mu(\epsilon)D} d\epsilon \quad (5)$$

is invertable.

The fact that the exponent of eq. (1) consists of a linear combination of basis functions suggests that a system of two equations of the form (1), each using a different $S_{(\epsilon)}$, might be invertable also. That is, where $$I_{1(P,C)} = -\ln \int_0^\infty S_{1(\epsilon)} e^{-P\mu p(\epsilon) - C\mu c(\epsilon)} d\epsilon \quad (6)$$

$$I_{2(P,C)} = -\ln \int_0^\infty S_{2(\epsilon)} e^{-P\mu p(\epsilon) - C\mu c(\epsilon)} d\epsilon$$

comprises a set of two non-linear functions of the line integrals P and C, the system may be inverted over a region where the determinant of its Jacobian is non-zero. This condition is met for all P and C if the effective spectra $S_1$ and $S_2$ are sufficiently different; however, system conditioning is very important as we shall see in the next section.

The Jacobian $[J_{(P,C)}]$ is described by $$\begin{pmatrix} dI_1 \\ dI_2 \end{pmatrix} = \begin{bmatrix} \delta I_1/\delta P & \delta I_1/\delta C \\ \delta I_2/\delta P & \delta I_2/\delta C \end{bmatrix} \cdot \begin{pmatrix} dP \\ dC \end{pmatrix} \quad (7)$$

where:

$$\delta I_J/\delta P = \frac{\int_0^\infty S_{J(\epsilon)} \mu p(\epsilon) e^{-P\mu p(\epsilon) - C\mu c(\epsilon)} d\epsilon}{\int_0^\infty S_{J(\epsilon)} e^{-P\mu p(\epsilon) - C\mu c(\epsilon)} d\epsilon} \quad (8)$$

$$\delta I_J/\delta P = \frac{\int_0^\infty S_{J(\epsilon)} \mu c(\epsilon) e^{-P\mu p(\epsilon) - C\mu c(\epsilon)} d\epsilon}{\int_0^\infty S_{J(\epsilon)} e^{-P\mu p(\epsilon) - C\mu c(\epsilon)} d\epsilon} \quad (9)$$

if the determinant of eq. (7) is non-zero we have the result:

$$\begin{pmatrix} dP \\ dC \end{pmatrix} = \frac{\begin{bmatrix} \delta I_2/\delta C & -\delta I_1/\delta C \\ -\delta I_2/\delta P & \delta I_2/\delta P \end{bmatrix} \begin{pmatrix} dI_1 \\ dI_2 \end{pmatrix}}{(\delta I_1/\delta P \cdot \delta I_2/\delta C - \delta I_2/\delta P \cdot \delta I_1/\delta C)} \quad (10)$$

$$= [J_{(P,C)}]^{-1} \cdot \begin{pmatrix} dI_1 \\ dI_2 \end{pmatrix}$$

This, of course, cannot be integrated to yield $P(I_1,I_2)$ and $C(I_1,I_2)$ because the Jacobian itself is a function of P and C. However, in difference equation form, eq. (10) suggests the two dimensional Newton-Raphson solution:

$$\begin{pmatrix} P_{N+1} \\ C_{N+1} \end{pmatrix} = [J(P_N,C_N)]^{-1} \cdot \begin{pmatrix} I_1 - I_1'(P_N,C_N) \\ I_2 - I^{2'}(P_N,C_N) \end{pmatrix} + \begin{pmatrix} P_N \\ C_N \end{pmatrix} \quad (11)$$

for which the sequences $P_i(I_1,I_2)$ and $C_i(I_1,I_2)$ converge to the desired functions $P(I_1,I_2)$ and $C(I_1,I_2)$. In practice, convergence is quite rapid because the functions are nearly quadratic. Furthermore, because the linearity of the system is not very great, the inverse Jacobian need not be updated on every iteration.

In a preferred implementation, a calibration procedure would determines $S_1(\epsilon)$ and $S_2(\epsilon)$ as vectors so that eqs. (8) and (9) are evaluated. Then the functions $P(I_1,I_2)$ and $C(I_1,I_2)$ are evaluated by the procedure of eq. (11) to generate a table of bivariate polynomials. Then, during reconstruction, the tables or polynomials are be used to generate photoelectric or Compton line integrals.

It is our purpose to demonstrate a mono-energetic reconstruction technique.

After the P and C line integrals are obtained, they are substituted into eq. (1) and $S(\epsilon)$ is replaced with a unit impulse at the desired $\epsilon'$. This reduces eq. (1) to simply, $$I_{(P,C)} = P \cdot \mu p(\epsilon') + C \cdot \mu c(\epsilon') \quad (12)$$

This data is used to reconstruct a mono-energetic image. Note that no N.L.C. correction is to be used in the dual energy reconstruction, thus the reconstruction time is only slightly increased by this method. It might also be noted that, if only one reconstruction energy is required, eq. (12) may be incorporated into the table of polynomial generation, thus reducing by two the number of table entries of polynomials required. Before proceeding with the specifics of implementation, it is instructive to examine the effects of the Jacobian on noise.

NOISE ANALYSIS

In dual energy reconstruction there are many factors which affect both noise and soft tissue contrast, and hence signal to noise ratio. Our goal here, is to increase contrast as well as signal to noise ratio with dose equivalent techniques. This technique achieves nearly a 100% improvement in signal to noise ratio and 50% increase in contrast, as compared to contemporary dual energy methods.

The key to realizing these gains lies in the examination of the interactions between the inverse Jacobian, reconstruction energy and the KVP and dose of the two energies employed. As stated previously, the degree of nonlinearity of this process is relatively small, thus it can be expected that the Jacobian will not vary a great deal over a reasonable range of attenuations. This, coupled with the fact that the noise $\sigma_1$ and $\sigma_2$ on the input signals $I_1$ and $I_2$ are very small (typically tenths of a percent), allows a 'small signal' analysis to be employed.

Combining equations (10) and (12) we have, for small variations in attenuations, $$\Delta I_{(P,C)} = [\mu p(\epsilon') \mu c(\epsilon')] \frac{\begin{bmatrix} \delta I_2/\delta C & -\delta I_1/\delta C \\ -\delta I_2/\delta P & \delta I_1/\delta P \end{bmatrix}}{DET[J]} \quad (13)$$

The variations on $I_1$ and $I_2$ are considered to be statistically independent Poisson noise. This would be typical of any conceivable dual energy system. For the purpose of noise analysis it is convenient to rewrite equation (13) using vector notation and inner products. Thus, $$\Delta I_{(P,C)} = \Delta I_1 \cdot \left\langle \begin{pmatrix} \mu p(\epsilon') \\ \mu c(\epsilon') \end{pmatrix}, \begin{pmatrix} \delta I_2/\delta C \\ -\delta I_2/\delta P \end{pmatrix}_D \right\rangle + \quad (14)$$

$$\Delta I_2 \cdot \left\langle \begin{pmatrix} \mu p(\epsilon') \\ \mu c(\epsilon') \end{pmatrix}, \begin{pmatrix} -\delta I_1/\delta C \\ \delta I_1/\delta P \end{pmatrix}_D \right\rangle$$

where $\langle, \rangle$ denotes the inner product and the subscript "D" denotes division of the vector by $DET[J]$. Using this notation, the variance $\sigma_M^2$ of the monoenergetic projection would be $$\sigma_M^2 = \sigma_1^2 \cdot \left\langle \begin{pmatrix} \mu p(\epsilon') \\ \mu c(\epsilon') \end{pmatrix}, \begin{pmatrix} \delta I_2/\delta C \\ -\delta I_2/\delta P \end{pmatrix}_D \right\rangle^2 + \quad (15)$$

$$\sigma_2^2 \cdot \left\langle \begin{pmatrix} \mu p(\epsilon') \\ \mu c(\epsilon') \end{pmatrix}, \begin{pmatrix} -\delta I_1/\delta \\ \delta I_1/\delta P \end{pmatrix}_D \right\rangle^2$$

Thus, the greater the determinant, the lower will be the noise. This is an indicator of the conditioning of the system. However, in order to increase the determinant the lower energy spectrum $S_{2(\epsilon)}$ must involve more photoelectric interaction. This implies an increase in $\sigma_2$, which occurs rather rapidly with decreasing effective energy of $S_{2(\epsilon)}$. For practical considerations we will use 70 KVP, since below this value $\sigma_2$ becomes prohibitively high. Increasing the effective energy of $S_{1(\epsilon)}$ also increases the determinant, but beyond about 120 KVP the effect tapers off as the photon interactions become increasingly Compton, and the average dose per photon begins to increase.

In order to proceed any further some numerical data are required. These are contained in, or derived from Table I. We will use henceforth, for purpose of illustration, a dual energy example at 120 KVP and 70 KVP and an operating point of P=34 and C=22, which corresponds to approximately 18 cm. of tissue and 2.5 cm. of dense bone, reasonable approximations for a head scan of a typical adult patient. This yields an inverse Jacobian of, $$[J_{(P,C)}]^{-1} = \begin{bmatrix} -52.43 & 48.60 \\ 9.043 & -3.039 \end{bmatrix} = \begin{bmatrix} \begin{pmatrix} \delta I_2/\delta C \\ -\delta I_2/\delta P \end{pmatrix}_D & \begin{pmatrix} -\delta I_1/\delta C \\ \delta I_1/\delta P \end{pmatrix}_D \end{bmatrix} \quad (16)$$

Note that this implies a negative determinant, which will always be the case when the effective energy of $S_1$ is greater than that of $S_2$.

TABLE I

| KeV | $S_{1(\epsilon)}$ | $S_{2(\epsilon)}$ | $\mu p(\epsilon)$ | $\mu c(\epsilon)$ |
|---|---|---|---|---|
| 10 | .004 | .002 | 4.81276 | .2157 |
| 20 | .006 | .023 | .58110 | .2081 |
| 30 | .055 | .189 | .16872 | .2012 |
| 40 | .104 | .301 | .07016 | .1949 |
| 50 | .134 | .294 | .03553 | .1891 |
| 60 | .149 | .190 | .02037 | .1837 |
| 70 | .149 | .001 | .01273 | .1788 |
| 80 | .140 | — | .00847 | .1742 |
| 90 | .119 | — | .00592 | .1699 |
| 100 | .089 | — | .00429 | .1659 |
| 110 | .049 | — | .00321 | .1622 |
| 120 | .002 | — | .00246 | .1587 |

At this point we introduce the "orthogonality principle". The basis of this idea is that, although $I_1$ and $I_2$ are statistically independent, P and C as defined by equation (10) clearly are not. But fortuitously, they are always negatively correlated, because the partial derivatives are positive, and furthermore the vectors of equation (15) consist of positive elements. Thus, by proper choice of $\epsilon'$ and hence the $\mu$ vectors of equation (15), one achieves considerable noise cancellation in spite of the large magnitude (as exemplified by equation (16)) of the "$I_2$" and "$I_1$" vectors. That is to say, that we would like to choose a $\mu$ vector in equation (15) which is nearly orthogonal to one or both of the "$I_j$" vectors.

In general, it is desirable to reconstruct at the lowest possible monochromatic energy in order to increase soft tissue contrast. It should be noted in Table I that, as energy decreases, the ratio of $\mu p$ to $\mu c$ increases. Moving from 120 KeV down to 10 KeV, orthogonality would first be achieved with the "$I_1$" vector then with the "$I_2$" vector.

For the purpose of illustration (referring to equation (15)), let us suppose that we choose a $\mu(\epsilon')$ vector which is nearly orthogonal to the "$I_2$" vector. This allows the lowest practical $\epsilon'$. In so doing, we deemphasize the significance of $\sigma_1$ (and hence dose at the high energy $S_1$) and can then increase dose in the $S_2$ energy range, reducing $\sigma_2$. It will be shown later that this prudent choice of the $\mu$ vector and dose ratios results in a significant increase in signal to noise ratio.

If the $\mu$ vector and dose ratios are optimally chosen for lowest noise per total unit dose, a further improvement in contrast is obtained by observing that the photoelectric component of the $\mu$ vector is still small ($\approx 1/6$) in comparison with the Compton component. We do not want to disturb this state, however, if for the moment we assume that adjacent spatial samples are correlated in photoelectric component but statistically independent in quantum noise (an approximation which will be addressed later) a lower energy reconstruction can be obtained.

The concept here is to retain the "orthogonality condition", but by spatial filtering of the photoelectric component prior to application of equation (12), achieve an effectively increased $\mu p(\epsilon')$. After P and C are determined, the entire process is linear (including the proposed filtering) then, $$I_{(P,C)D} = [\mu p(\epsilon''), \mu c(\epsilon')] \begin{pmatrix} P_{(t)} * F_{(t)} \\ C_{(D)} \end{pmatrix} \quad (17)$$

where * denotes convolution, $\mu p(\epsilon'')$ is the increased $\mu p$ and $F_{(t)}$ is a filter function such that, $$F_{(0)} = \mu p(\epsilon')/\mu p(\epsilon'') \quad (18)$$

and, $$\sum_{-\infty}^{\infty} F_{(t)} = 1 \quad (19)$$

The effect of equation (17) is to reduce the monochromatic reconstruction energy. However, because of equation (18), optimality is not compromised. That is, the "orthogonality" conditions remain the same, although some residual uncorrelated noise will be added by adjacent samples due to the requirement of equation (19).

Assuming that adjacent samples are uncorrelated and have the same variance, we obtain for the mono-energetic noise variance, $$\sigma_M^2 = \sigma_1^2 \cdot \left[ \left\langle \begin{pmatrix} \mu p(\epsilon') \\ \mu c(\epsilon') \end{pmatrix}, \begin{pmatrix} \delta I_2/\delta C \\ -\delta I_2/\delta P \end{pmatrix}_D \right\rangle^2 + \sum_{t \neq 0} F_{(t)}^2 \cdot (\mu p(\epsilon'') \cdot \delta I_2/\delta C)^2 \right]$$

$$+ \sigma_2^2 \cdot \left[ \left\langle \begin{pmatrix} \mu p(\epsilon') \\ \mu c(\epsilon') \end{pmatrix}, \begin{pmatrix} -\delta I_1/\delta C \\ \delta I_1/\delta P \end{pmatrix}_D \right\rangle^2 + \sum_{t \neq 0} F_{(t)}^2 \cdot (\mu P(\epsilon'') \cdot \delta I_1/\delta C)^2 \right] \quad (20)$$

where the summations represent the "sidelobe" residues, which may be made quite small with moderately wide filter functions. Theoretically they are made to vanish when equation (20) would equal equation (15) while still achieving the lower effective energy $\epsilon''$.

It is very important to observe here that the objective is not specifically to reduce photoelectric noise, but instead to filter to the point where the desired degree of orthogonality occurs. Excessive filtration will actually increase the noise $\sigma_M$.

At first glance it may seem that spatial filtering to reduce noise here, involves the same compromises involved in conventiona imaging. This is far from true however, because the filtering is done on the photoelectric component only. The result is that the M.T.F. is material dependent, as may be illustrated by the following (by equation (17)):

$$I_M(t) = [\mu p(\epsilon''), \mu c(\epsilon')] \begin{pmatrix} P(t) * F(t) \\ C(t) \end{pmatrix} \quad (21)$$

Letting $P_{(t)}$ and $C_{(t)}$ be delta functions, we have for the M.T.F. of $I_M$, $$H'(\omega) = [\mu p(\epsilon''), \mu c(\epsilon')] \begin{pmatrix} G(w) \\ 1 \end{pmatrix} \quad (22)$$

where $G(\omega)$ is the Fourier transform of $F_{(t)}$ and is unity at $\omega=0$ by eq. (19). Normalizing $H_{(\omega)}$ to unity at $\omega=0$ we have $$H'(\omega) = (\mu p(\epsilon'') \cdot G(\omega) + \mu C(\epsilon'))/(\mu p(\epsilon'') + \mu c(\epsilon')) \quad (23)$$

This of course would be applicable to a water-like material where P=C.

For a mono-energetic reconstruction at 51 KeV, which will later be seen to be the point of maximum S/N ratio for our selected technique factors, we have $$\mu p(\epsilon'')=0.0324 \text{ and } \mu c(\epsilon')=0.185 \quad (24)$$

Thus, the effect of $G_{(\omega)}$ will be only 15% of the overall response, virtually negligible for practically any $G_{(\omega)}$. In fact, for the "optimal" filter chosen for our technique factors, the worst case reduction of overall M.T.F. is a mere 4.7%, near the mid spatial frequencies. That filter is, $$F(t) = [0.05\ 0.05\ 0.8\ 0.05\ 0.05] \quad (25)$$

and its M.T.F. is, $$G(\omega) = .8 + .1 \cos \omega + .1 \cos 2\omega \Big|_0^\pi \quad (26)$$

where $\pi$ corresponds to the Nyquist frequency. This function is depicted in FIG. 1.

For other than water-like materials, where P and C differ considerably, the resultant M.T.F. may be imagined as $G_{(\omega)}$ sitting on a "pedestal" whose amplitude corresponds to the relative changes in P and C. The worst case would be that where, the photoelectric component only changes and the overall M.T.F. becomes $G_{(w)}$. Still not too bad a result. Because the reconstruction process is a linear operation, the effect on an image would be that of superposition of a $G_{(\omega)}$ filtered photoelectric image and a Compton image, each weighted by equation (24).

ALGORITHM AND NUMERICAL ANALYSIS

This algorithm differs from other dual energy methods primarily in that it calls for a specially determined convolution $F_{(t)}$ of the photoelectric component of the output of equation (11). This will be seen to substantially improve both contrast and S/N ratio. This technique, based on the "orthogonality principle", also indicates a method for allocation of dose to each energy range such that S/N is further improved.

Implementation requires a calibration procedure for determination of $S_1$ and $S_2$, and determination of the system scale factor for ln(x). From this a table similar to Table II is generated, with appropriate resolution, by means of the iterative procedure of equation (11). This table may be interpolated during reconstruction or used to generate bivariate polynomials. Note that the table coordinates are $I_1$ and $I_2/I_1$. This is done to preserve memory, as the lower energy attenuation $I_2$ is generally 1.2 to 1.6 times higher than $I_1$, and values outside this range are not needed.

Reconstruction simply requires an $I_1$, $I_2$ table interpolation or polynomial evaluation for each projection. The photoelectric line integrals are then convolved with $F_{(t)}$ and linearly combined with the Compton components as in eq. (21) for the desired monochromatic energy.

TABLE II

| | | P.E. & CMT. AS A FUNCTION OF $I_1$ & $I_2/I_1$ | | | | | | | | |
|---|---|---|---|---|---|---|---|---|---|---|
| | P.E. | | | | | $I_2/I_1$ | | | | |
| | CMT. | 1.20 | 1.25 | 1.30 | 1.35 | 1.40 | 1.45 | 1.50 | 1.55 | 1.60 | 1.65 |
| $I_1$ | 1.0 | 3.229 | 4.651 | 6.162 | 7.757 | 9.432 | 11.187 | 13.019 | 14.928 | 16.911 | 18.966 |
| | | 5.075 | 4.890 | 4.706 | 4.522 | 4.340 | 4.157 | 3.975 | 3.794 | 3.614 | 3.434 |
| | 2.0 | 7.063 | 10.419 | 14.085 | 18.047 | 22.284 | 26.767 | 31.471 | 36.373 | 41.458 | 46.709 |
| | | 10.232 | 9.886 | 9.540 | 9.196 | 8.854 | 8.514 | 8.176 | 7.842 | 7.512 | 7.185 |
| | 3.0 | 11.351 | 17.068 | 23.403 | 30.270 | 37.589 | 45.304 | 53.373 | 61.757 | 70.421 | 79.330 |
| | | 15.465 | 14.972 | 14.481 | 13.994 | 13.512 | 13.037 | 12.567 | 12.105 | 11.648 | 11.198 |
| | 4.0 | 16.032 | 24.449 | 33.772 | 43.839 | 54.539 | 65.784 | 77.491 | 89.583 | 101.992 | 114.665 |
| | | 20.761 | 20.134 | 19.512 | 18.899 | 18.294 | 17.699 | 17.113 | 16.538 | 15.973 | 15.418 |
| | 5.0 | 21.044 | 32.383 | 44.902 | 58.384 | 72.660 | 87.577 | 103.000 | 118.826 | 134.974 | 151.379 |
| | | 26.112 | 25.363 | 24.623 | 23.894 | 23.178 | 22.476 | 21.787 | 21.114 | 20.455 | 19.809 |
| | 6.0 | 26.316 | 40.736 | 56.614 | 73.650 | 91.581 | 110.192 | 129.322 | 148.850 | 168.677 | 188.719 |
| | | 31.512 | 30.651 | 29.802 | 28.968 | 28.150 | 27.351 | 26.571 | 25.809 | 25.066 | 24.340 |
| | 7.0 | 31.788 | 49.417 | 68.771 | 89.420 | 111.015 | 133.303 | 156.100 | 179.257 | 202.650 | 226.178 |
| | | 36.956 | 35.991 | 35.040 | 34.108 | 33.198 | 32.311 | 31.447 | 30.606 | 29.786 | 28.988 |
| | 8.0 | 37.416 | 58.360 | 81.253 | 105.527 | 130.771 | 156.696 | 183.085 | 209.757 | 236.572 | 263.428 |
| | | 42.440 | 41.377 | 40.331 | 39.308 | 38.313 | 37.345 | 36.403 | 35.489 | 34.600 | 33.737 |
| | 9.0 | 43.168 | 67.503 | 93.962 | 121.853 | 150.712 | 180.210 | 210.088 | 240.147 | 270.246 | 300.297 |
| | | 47.959 | 46.804 | 45.668 | 44.561 | 43.486 | 42.442 | 41.430 | 40.448 | 39.497 | 38.574 |
| | 10.0 | 49.019 | 76.796 | 106.824 | 138.311 | 170.737 | 203.721 | 236.975 | 270.300 | 303.572 | 336.722 |
| | | 53.511 | 52.267 | 51.048 | 49.861 | 48.711 | 47.596 | 46.508 | 45.475 | 44.464 | 43.484 |

For simulation procedures however, the spectra are given by Table I.

Figure 2:
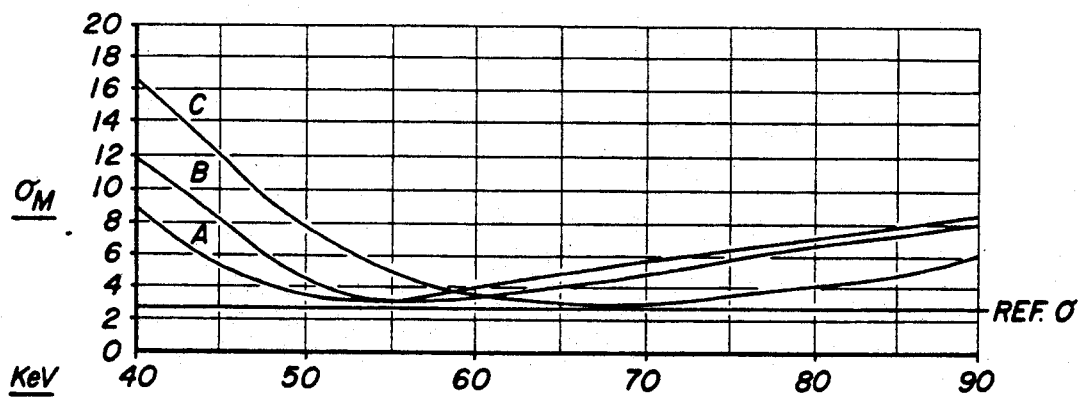
FIG. 2 is a graphical comparison illustrating improved signal to noise ratios achieved by the present invention relative to that predicted by prior dual energy techniques.
Figure 3:
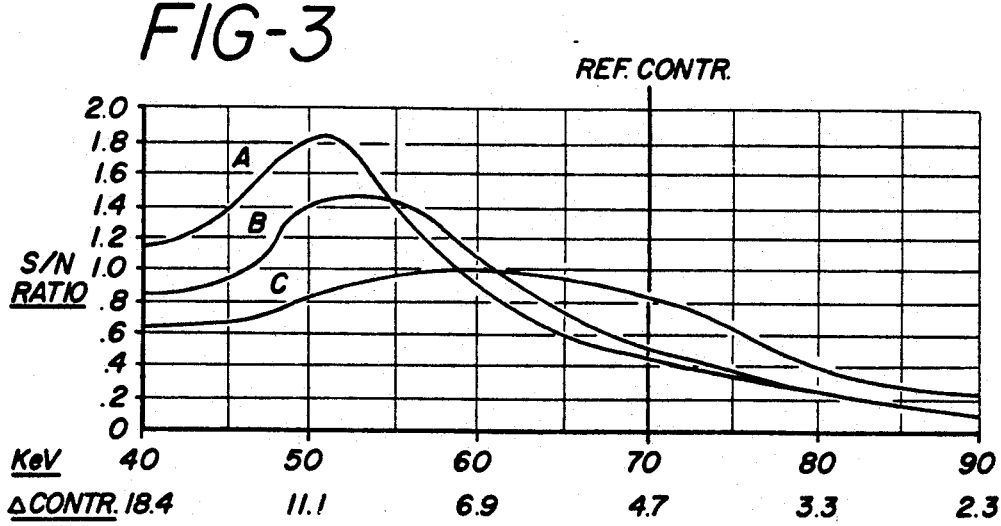
FIG. 3 is a graphical representation similar to FIG. 2.

Performance of this technique is compared with conventional dual energy methods in FIGS. 2 and 3. All are evaluated at equal dose and are referenced to a 120

KVP polychromatic scan at the same dose. All use a shaped filter, such as disclosed in U.S. Pat. No. 4,288,695 to Walters, et al. ideally configured for a 20 cm. water phantom, from which dose calculations are derived (dose calculations are corrected for photon energy dependence). Table III gives the technique factors for each example. In FIGS. 2 and 3, signals and noise levels are normalized at each energy (as is normally done in practice) to 20 cm. of $H_2O$, using the 120 KeVP reference attenuation of ln=3.92. Noise levels are specified as seen on the resultant normalized projections.

TABLE III

| | KeVP | ma | Time | Dose | Comment |
|---|---|---|---|---|---|
| REF | 120 | 100 | 4 sec. | 1.45 R | Reference polychromatic |
| A | 120 | 25 | 4 sec. | .36 R | photoelectric |
| | 70 | 200 | 4 sec. | 1.09 R | convolution |
| B | 120 | 25 | 4 sec. | .36 R | optimized |
| | 70 | 200 | 4 sec. | 1.09 R | doses |
| C | 120 | 73 | 4 sec. | 1.06 R | Conventional D.E. |
| | 70 | 73 | 4 sec. | .39 R | equal ma. |

As a standard "signal" for S/N ratio determination, the grey and white brain matter has been chosen. This proves to be an excellent and challenging test because they have virtualy identical electron densities and differ only in effective atomic number. Below are listed the physical characteristics of grey and white matter as well as water.

TABLE IV

| SUBSTANCE | Z* | $e_{(e)}$ | P | C |
|---|---|---|---|---|
| $H_2O$ | 7.52 | 1.00 | 1.0000 | 1.00 |
| GREY MATTER | 7.68 | 1.03 | 1.1116 | 1.03 |
| WHITE MATTER | 7.54 | 1.03 | 1.0399 | 1.03 |

Using this data we obtain the mass attenuation coefficients $\mu_{(e)}$ for grey and white matter as:

| KeV | GREY | WHITE | CONTRAST Δ #'s |
|---|---|---|---|
| 10 | 5.4096 | 5.0749 | 70.0 |
| 20 | .8352 | .7948 | 50.8 |
| 30 | .3833 | .3715 | 31.8 |
| 40 | .2706 | .2657 | 18.4 |
| 50 | .2274 | .2249 | 11.1 |
| 60 | .2057 | .2043 | 6.9 |
| 70 | .1925 | .1916 | 4.7 |
| 80 | .1833 | .1827 | 3.3 |
| 90 | .1763 | .1759 | 2.3 |
| 100 | .1705 | .1702 | 1.8 |
| 110 | .1656 | .1654 | 1.2 |
| 120 | .1613 | .1612 | .6 | where each Δ number represents 0.1% of contrast.

This data seems to accurately predict the behavior of grey and white matter, and was used in the calculation of the functions depicted in FIGS. 2 and 3. The technique factors and filter function $F_{(t)}$ are near optimal for demonstration of the advantages of the "orthogonality principle". However, it is very likely that these results may be improved upon significantly by filter functions with lower root mean square (R.M.S.) "sidelobes" and modification of the effective spectra $S_1$ and $S_2$.

The fact that the majority of noise reduction accomplished by this process occurs by reason of cancellation of the correlated components of the photoelectric and Compton data, rather than filtering per se, implies that changes in the Jacobian might significantly alter the signal to noise ratio. Because the system is non-linear the Jacobian, and hence the degree of correlation, will change with attenuation. The result is that the "orthogonality" conditions will change the attenuation.

Under ideal conditions, especially with a shaped filter, these changes will be small. Alternatively, if optimal signal to noise ratios are to be obtained under varying conditions, $F_{(O)}$ should be changed dynamically in order to preserve orthogonality. This is not too difficult to accomplish, because the optimal $\mu(\epsilon')$ referred to in equation (15) is a function of the Jacobian, $\sigma_1$ and $\sigma_2$; all of which are entirely dependent on $I_1$ and $I_2$ only (given fixed technique factors). The optimal vector $\mu(\epsilon')$ can be expressed as a scalar, because only its direction is significant. This means that a third element may be precomputed for each cell of Table II, giving the ratio of $\mu p(\epsilon')$ to $\mu c(\epsilon')$.

Again using a small signal analysis and referring to equations (15) and (16) it can be shown that the optimal ratio may be expressed as:

$$\frac{\alpha}{1-\alpha} = \frac{\mu p(\epsilon')}{\mu c(\epsilon')} = \frac{(\sigma_1^2 \cdot x \cdot \delta I_2/\delta P - \sigma_2^2 \cdot y \cdot \delta I_1/\delta P)}{(\sigma_1^2 \cdot x^2 + \sigma_2^2 \cdot y^2)} \quad (27)$$

where $$X = \delta I_2/\delta C + \delta I_2/\delta P \quad (28)$$
$$Y = -(\delta I_1/\delta C + \delta I_1/\delta P)$$

The expression in $\alpha$ of equation (27) is used to reflect the normalization of the photoelectric and Compton components so that the signal to noise ratio is optimized without filtration.

Given a set of technique factors, a two dimentional table is generated which includes $\alpha/(1-\alpha)$, descrbing the optimal reconstruction energy at each operating (sample) point. One then chooses a fixed reconstruction energy $\epsilon''$ that will be implemented with the filtration technique described above. However, in this case, the center point of the kernal function $F_{(O)}$ will vary, depending on $\alpha/(1-\alpha)$, such that optimal cancellation of the correlated components of $P_{(t)}$ and $C_{(t)}$ will occur. Thus the center point of the filter would be:

$$F_{(0)} = \frac{\alpha}{1-\alpha} \cdot \frac{\mu c(\epsilon'')}{\mu p(\epsilon'')} \quad (29)$$

and, $$1 = F_{(0)} + \sum_{t \neq 0} F_{(t)} \quad (30)$$

Again, this assumes that the quantum noise is uncorrelated in time. If instrumentation and/or interpolation introduce any significant correlation, it is easily corrected by slightly modifying $F_{(t)}$. Equations (29) and (30) apply to filtration of the photoelectric signal component, and $F_{(O)}$ will generally be less than unity, requiring positive sidelobes. This will slightly reduce midrange M.T.F. and increase noise by the small RMS contribution of the sidelobes; however the increased contrast will generally be much greater.

A similar process may be applied to the Compton component, in which case, $$F_{(0)} = \frac{1-\alpha}{\alpha} \cdot \frac{\mu_p(\epsilon'')}{\mu_c(\epsilon'')} \quad (31)$$

and equation (30) still holds. In general $F'_{(0)}$ will be greater than unity, requiring negative sidelobes. This will result in a slight increase of midrange M.T.F. and a comparable increase in noise due to the RMS contribution of the sidelobes. In either case, the noise increase (over that of the optimal energy without filtration) is quite small, and may be controlled by reducing the amplitude and extending the width of the sidelobes. Any combination of both filters may also be applied so long as the resultant center point ratios adhere to $\alpha/(1-\alpha)$.

It was mentioned earlier that the orthogonality principle also plays a role in dose allocation. Once a pair of energy ranges are estabished, equations (27) and (28) may be used to determine dose allocation. If an estimate of the desired mono-energetic KeV is established then $\alpha$ may be determined from the $P_{(\epsilon)}$ and $C_{(\epsilon)}$ model.

Using standard dose calculation methods, the following relation can be established (normalized for constant dose)

$$\sigma_2^2 = 1\cdot31\, K(S_1, S_2) \cdot \sigma_1^2 \quad (32)$$

Using equations (27) and (32), the optimal dose allocation is computed. This is done for some standard object such as a water phantom (with a shaped filter) and is referenced to a particular attenuation at each of the high and low energy spectra. (Once dose allocations have been determined for the "standard object", $\sigma$ is treated as a variable function of I).

It is important to note that because many materials can be represented by linear combinations of the photoelectric and Compton basis set, any pair of sufficiently different materials may also serve as a basis set. It is a simple process to convert from one representation to another. This has many implications including calibration procedures as well as unique imaging modalities. For example, bone and water may be used as a basis set with all of the preceding techniques applicable.

This could be significant in situations where the usual photoelectric and Compton basis set is inaccurate. For example, in imaging the interface between a metal prosthesis and bone, one might desire to use the metal attenuation function and that of bone as a basis set. Also, more than two functions may be used in a basis set. However, in general, a different set of energy dependent information would have to be obtained for each function in the set. Thus, if one desired (for high accuracy) to use a dense metal, bone and water as a basis set, a triple energy scan would be in order. Again, the noise correlations in the basis coefficients would exist and the orthogonality principles would still apply.

Figure 4:
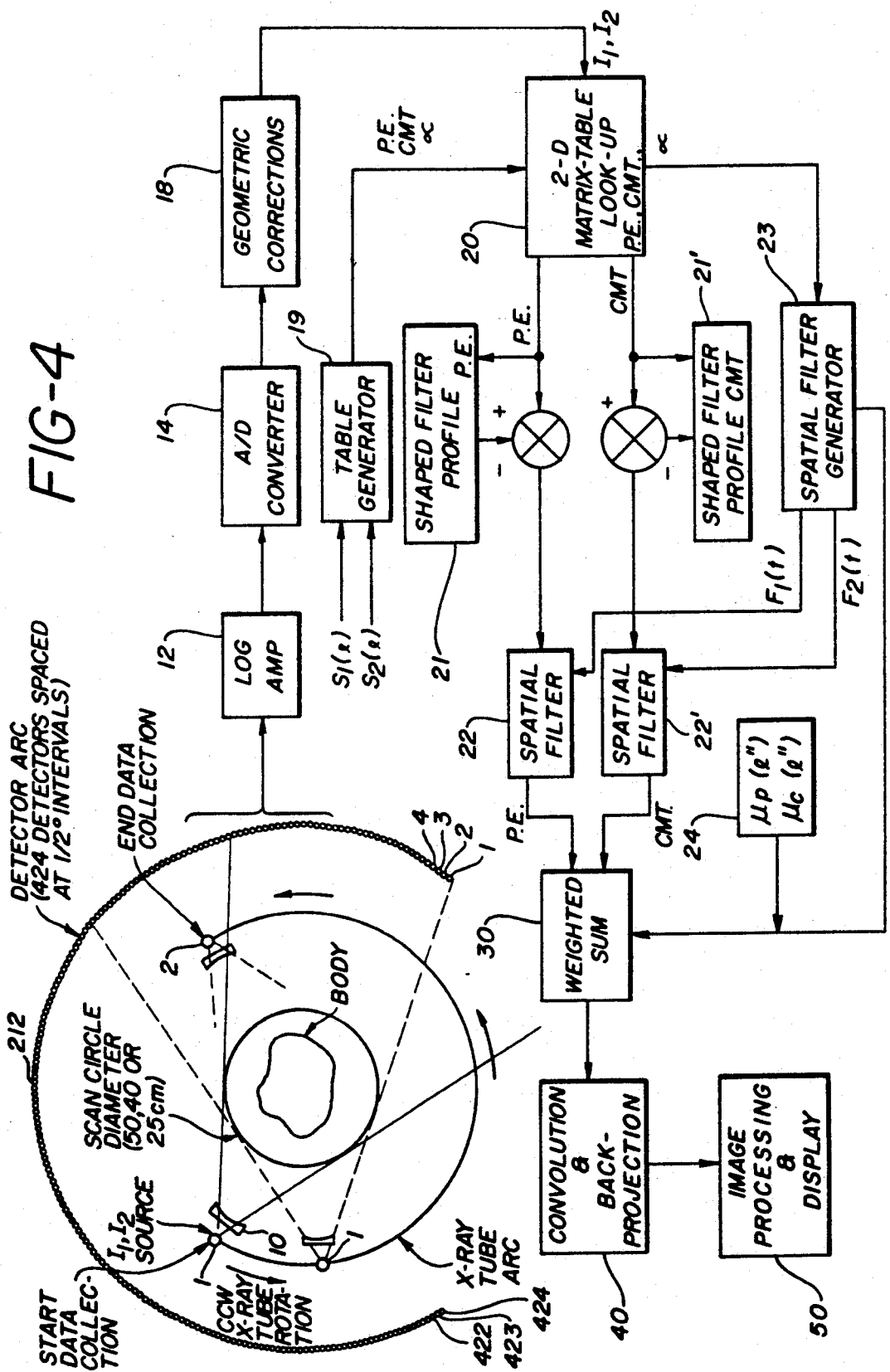
FIG. 4 is a CT scanner implementation of the present invention depicted in block diagram form.

An implementation of the principles of the present invention is shown in FIG. 4. A CT scanner is shown, including an X-ray source 1 and an array of 424 detectors. Numerous techniques may be employed to implement dual energy scanning. A first scan of 180° + fan such as described in U.S. Pat. No. 4,293,912 to Walters may be done at one energy level, the KV and ma output of the source changed to the second energy level, and a second scan performed. This could also be accomplished on a continuous 360° system with no interruption of motion. A spin filter may be employed in front of the X-ray source to rapidly alternate between energy levels during a single scan. A split detector system may be used, with detectors which detect at two different energy levels. The high voltage supply of the X-ray source may be modulated while scanning to alternately switch the X-ray source from one energy level to another.

Regardless of the scanning method employed, two arrays of data values representative of beam attenuation at the two energy levels are obtained. These data values are in the form of analog signals which are proportional to detected beam intensity. A log amp 12 converts these signals to logarithmic signal values, which are then digitized by an A/D converter 14.

The data values of the two arrays are then be adjusted for the effects of the geometry of the detector arc and the fan beam by a geometric conversion processor 18. Although this correction may alternatively be done later in the processing system, doing so at this stage affords some calibration advantages. The high and low energy arrays of attenuation values, shown as $I_1$ and $I_2$ values, are used to look up Compton and photoelectric effect values in a two-dimensional look-up table 20 similar to that shown in Table II. As discussed above, this table is developed by the table generator 19, by inserting values for $I_1$ and $I_2$ in equation (11) and performing an iterative process until the sequences $P_f(I_1,I_2)$ and $C_f(I_1,I_2)$ converge. Convergence is fairly rapid, and is attained in three or four iterations. This is done prior to scanning, and needs to be repeated only when technique factors are changed. Table II contains high energy attenuation coordinates $I_1$ along one axis and the ratio of $I_2/I_1$ attenuation coordinates along the other axis for efficient memory usage. For each location, both a photoelectric effect value (top) and a Compton value (bottom) are produced. Optionally $\alpha$ is produced for dynamic filtration. Values in the left side of the Table II represent soft tissue high in water content, where the Compton and photoelectric values are nearly the same, with materials of greater atomic number such as bone represented at the right side of the Table, since the photoelectric value for bone is approximately 5.6 times that of the Compton value.

In order to minimize the dose exposure of the patient, a parabolic shaped radiation filter 10 is generally inserted in the beam path between the X-ray source and the patient. This filter passes more energy through its center and hence the center of the patient, where more tissue must be traversed, than it does at the outer limits of the fan beam, where less tissue is being traversed. It is desirable to correct the data values for the effects of this shaped filter. During calibration, air scans are performed at the two energy levels to develop a high energy profile and a low energy profile. These profiles are then converted to photoelectric and Compton profiles by look-up table 20, and then stored for later use in shaped profile memories 21 and 21' respectively.

When a patient is scanned, the table look-up proceeds as before but spatially corresponding points of the shaped filter profiles are subtracted from the respective photoelectric and Compton outputs. Because all processing after the table look-up performs as a linear operator, this effectively removes any effects of the shaped filter from the image. The resulting data is then convolved with one or both spatial filters 22 and 22'.

This convolution is either fixed as in equation (25) (or its Compton counterpart as in equation (31)) or is dynamically convolved with a spatially variant transverse filter computed by the spatial filter generator 23. The filter generator performs in accordance with equations (27) thru (31) and accompanying text. The filter generator is preferably controlled by the desired reconstruction energy block 24, and places limits on the range of $F_{(O)}$ in order to prevent undesireable effects on spatial resolution.

After spatial filtering, the P and C values are applied to processor 30 where they are appropriately weighted [equation (24)] for monoenergetic reconstruction. The weighted components are linearly combined for the desired monochromatic energy as in equation (21), with the ratio of $\mu p(e\epsilon'')$ and $\mu c(\epsilon'')$ determining the reconstruction energy. From the inverse Jacobian of equation (16) it is seen by the signs of the equation values that the photoelectric and Compton noise values are negatively correlated. When the noise vectors are mapped using equation (16), it is seen that considerable noise cancellation will be achieved after the values are weighted and combined during reconstruction.

The reconstructed signals are then applied to conventional convolution and backprojection circuitry 40, and to circuitry 50 for performing image processing and display. As stated previously, alternative basis functions may be used for special applications. These may be generated by the table generator 19, with the weighting and filtering controlled by 24.

Figure 5:
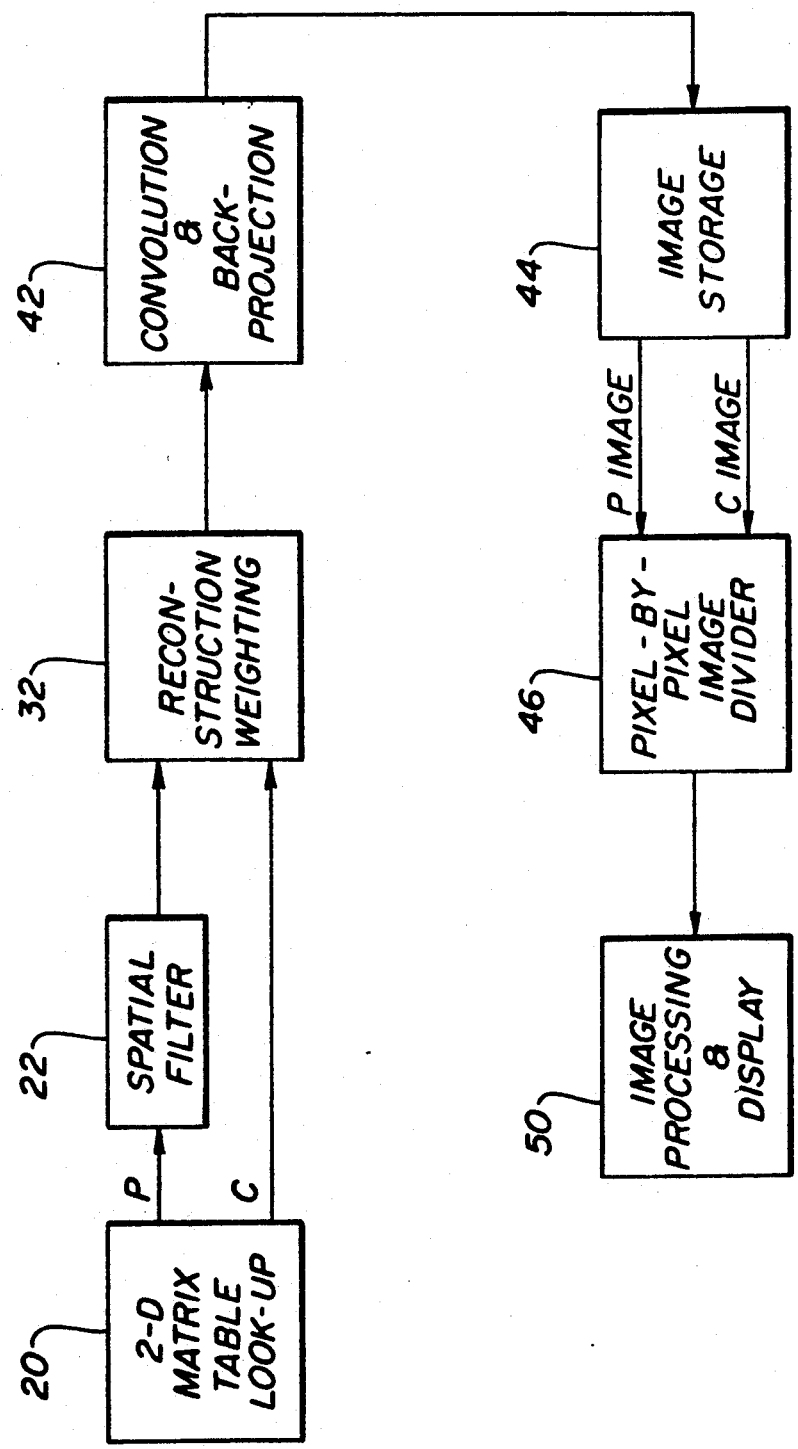
FIG. 5 is a modification to FIG. 4 illustrating a preferred method for producing atomic number dependent representative images.

The principles of the present invention may be employed to produce atomic number representative images as shown in FIG. 5. In FIG. 5, the photoelectric effect and Compton values produced by the two dimensional matrix 20 are appropriately spatially filtered by a filter 22. Convolution, backprojection and reconstruction weighting is then performed separately using the photoelectric effect and Compton values independently. This produces a Compton image, which is proportional to mass density, and a photoelectric effect image, which is proportional to both mass density and the effective atomic number of the imaged material. The images are stored, whereafter the photoelectric image information is divided on a pixel-by-pixel basis by the Compton image information. This process yields an image in which atomic number dependencies can be determined as mass density factors cancel, giving a purely chemical picture of the subject in terms of atomic number raised to the power of approximately 3.62.

A useful mode of display in this case would result from the use of a color monitor in which psuedo-color is generated by the atomic number dependent image with the luminance signal generated by the essentially density dependent Compton image. Also the divider 46, of FIG. 5 is, alternatively, replaced by a weighted adder, providing greater computational efficiency in viewing data at multiple mono-energetic KeV's by eliminating multiple reconstructions.

The processes described here are equally applicable to "projection only" systems, such as those used in digital radiography, as all of the methods applied in signal to noise ratio improvement operate at the projection level. Noise is a significant problem in dual energy digital radiography and the benefits of the orthogonality principle are hence equally beneficial.

The block diagram of FIG. 4 applies for digital radiography, except for the convolution and backprojection, and the input to the log amplifier (and possibly shaped filter—which in some cases would be a benefit). In digital radiography high resolution two dimensional projections are available. Thus, the sidelobes of the spatial filters may be spread out in two dimensions. This permits somewhat more latitude in the range of $F_{(O)}$ with even less effect on spatial resolution.

Because digital radiography images are "shadowgrams" the role of alternate basis functions becomes even more important. For example, using a bone and water basis set, bone is easily removed from the radiographs while signal to noise ratio is improved by lowering the effective monoenergetic spectra. In the same manner sensitivity to invasive contrast media can be increased.

I claim:

1. In a multiple energy scanning system wherein each energy scan is selected for predominant emphasis of data from a different one of first and second basis sets and wherein first and second images are first reconstructed based respectively on data from each of said basis sets, imaging apparatus comprising:
    a) means for developing a first filter function for convolution with said first image;
    b) means for developing a second filter function for convolution with said second image;
    c) means for dynamically varying said first and second filter functions relative to one another for maintenance of mutual orthogonality of said basis sets thereby to provide cancellation of correlated noise components;
    d) means, responsive to said respective means for developing, for performing said respective convolutions; and
    e) means for developing a composite image as a composite weighted superposition of said respective convolved images.

2. Apparatus as described in claim 1 wherein said means for dynamically varying comprises means for regulating the center point of at least one of said filter functions and means. responsive to said means for regulating, for defining side lobes to at least one of said filter functions to provide mutual cancellation of correlated noise components.

3. Apparatus as described in claim 2 wherein said means for regulating operates in accordance with the relationship $$F_{(O)} = (\alpha/(1-\alpha)) \cdot (\mu c(\epsilon'')/\mu p(\epsilon''))$$

and $1 = F_{(O)} + \Sigma F(t)$ for $t = \phi$, where $F_{(O)}$ is the kernel of the filter function $F(t)$, $\alpha$ determines the relative weighting points of the filters, and $\mu c(\epsilon'')$ and $\mu p(\epsilon'')$ are vector operators related to the radiation mass absorption characteristics for said first and second basis sets, respectively.

4. Apparatus as described in claim 3 wherein said means for regulating comprises means for generating a two dimensional table, including $\alpha/(1-\alpha)$, describing the optimal reconstruction energy at each operating sample point.

5. Apparatus as described in claim 4 wherein said means for regulating operates on one of said filter functions in accordance with the relationship $$F_{(O)} = (1\text{-}31\ \alpha)) \cdot \mu c(\epsilon'')/\mu p(\epsilon''))$$

and operates on the other of said filter functions in accordance with the relationship $$F'_{(o)} = (1\alpha)/\alpha) \cdot (\mu p(\epsilon'')/\mu c(\epsilon'')).$$

6. Apparatus as described in claim 1 wherein one said basis set is Compton scattering and the other said basis set is photoelectric scattering.

7. Apparatus as described in claim 1 wherein one said basis set is bone and the other said basis set is water.

8. Apparatus as described in claim 1 wherein said system is a Ct scanning system, said system further comprising a shaped energy filter to control local patient exposure to radiation, said means for dynamically varying comprising means for compensating for the altered patient energy absorption cross section occasioned by said shaped energy filter.

9. Apparatus as described in claim 8 and further comprising means, responsive to said means for dynamically varying, for correlating at least one of said respective convolved images, into images representative of the atomic number of respective tissues and materials being scanned.

* * * * *

UNITED STATES PATENT AND TRADEMARK OFFICE
CERTIFICATE OF CORRECTION

PATENT NO. : 5,115,394
DATED : May 19, 1992
INVENTOR(S) : Ronald G. Walters

It is certified that error appears in the above-identified patent and that said Letters Patent is hereby corrected as shown below:

Claim 5, Column 16, Line 62 should read as follows:

-- $F_{(o)} = (1-\alpha/(1-\alpha)) \cdot \mu c(\varepsilon'')/\mu p(\varepsilon''))$ --

Signed and Sealed this

Third Day of August, 1993

Attest:

MICHAEL K. KIRK

Attesting Officer     Acting Commissioner of Patents and Trademarks